March 2, 1971     D. M. WINCHESTER     3,566,501

METHOD OF MAKING SPIRAL CHUTE

Filed June 3, 1969     3 Sheets-Sheet 1

FIG. I

INVENTOR.
DONALD M. WINCHESTER
BY
*George Galuschein*
ATTORNEY

March 2, 1971  D. M. WINCHESTER  3,566,501
METHOD OF MAKING SPIRAL CHUTE
Filed June 3, 1969  3 Sheets-Sheet 2
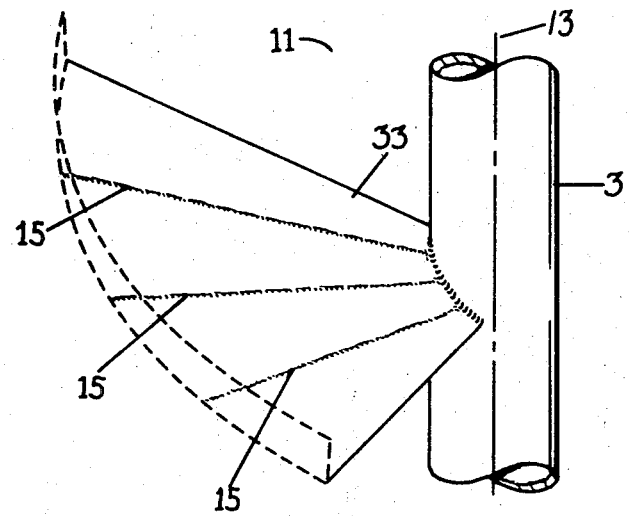
PRIOR ART
FIG. 2
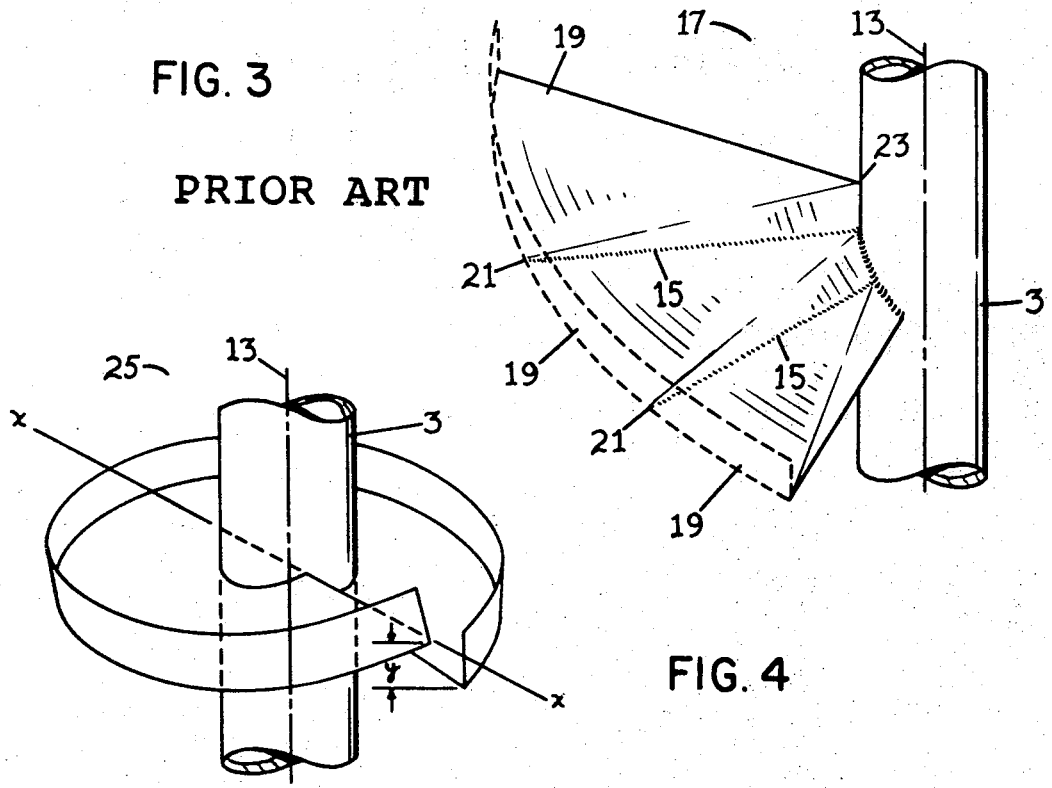
FIG. 3
PRIOR ART
FIG. 4
PRIOR ART
INVENTOR.
DONALD M. WINCHESTER
BY
ATTORNEY

INVENTOR.
DONALD M. WINCHESTER
BY
ATTORNEY

United States Patent Office 3,566,501
Patented Mar. 2, 1971

3,566,501
METHOD OF MAKING SPIRAL CHUTE
Donald M. Winchester, 11709 Sahara Way,
Dallas, Tex. 75218
Continuation-in-part of application Ser. No. 520,615,
Jan. 14, 1966. This application June 3, 1969, Ser.
No. 830,084
Int. Cl. B21d 53/00; B21k 29/00
U.S. Cl. 29—157.3  4 Claims

ABSTRACT OF THE DISCLOSURE

A method of manufacturing a spiral chute slide in which the slide is cut from a flat sheet which is then bent around straight lines tangential to the inner edge contour.

---

This application is a continuation-in-part of Ser. No. 520,615 filed on Jan. 14, 1966, now abandoned.

BACKGROUND OF THE INVENTION

This invention relates to means for the transfer of objects or personnel from one level to another. In particular, it relates to spiral chutes and introduces a new and novel configuration of spiral chutes, and a new and novel process with which to manufacture spiral chutes and components thereof.

Spiral chutes have found application in manufacturing and distributing facilities that require the vertical displacement of an article within a limited area, the convolutions of such a chute providing the advantage of a gradual descent capability within limited space. However, those chutes manufactured to date have incorporated deficiencies inherent to the known and practiced methods of manufacture, several of the more widely practiced of such identifiable as the "roll and weld," "brake" and "cakepan" methods. The deficiencies of these methods of manufacturing spiral chutes, as will be hereinafter shown, include the need for a large number of parts, high manufacturing and tooling costs, a lack of continuity and smoothness to the sliding surface along which the transferring object or personnel are to descend, and the presence of fatigue-susceptible and contaminable seams. Other deficiencies of the prior art and their correction by the present invention will become evident from the appended drawings and the descriptive matter hereinafter set forth.

Accordingly, it is an object of the present invention to provide an improved method of manufacturing spiral chutes.

Another object is to provide an improved configuration of a spiral chute.

It is also an object to provide a spiral chute with minimal distortion and buckling of the sliding surface.

It is an object to provide a method of fabricating spiral chutes from flat sheets that does not entail twisting of the sheets.

It is an additional object to provide a spiral chute fabricated from a small number of parts with reduced fabrication and tooling costs.

Another object is to provide a spiral chute with a minimal number of seams or welds in the path of the sliding object and with reduced vulnerability to contamination.

Referring to the accompanying drawings:

FIG. 2 is a view in perspective of a portion of a spiral chute manufactured by the "roll and weld" method of manufacture.

FIG. 3 is a view in perspective of a portion of a spiral chute manufactured by the "brake" method of manufacture.

FIG. 4 is a view in perspective of one section of a spiral chute employing in the "cakepan" method.

Figure 1:
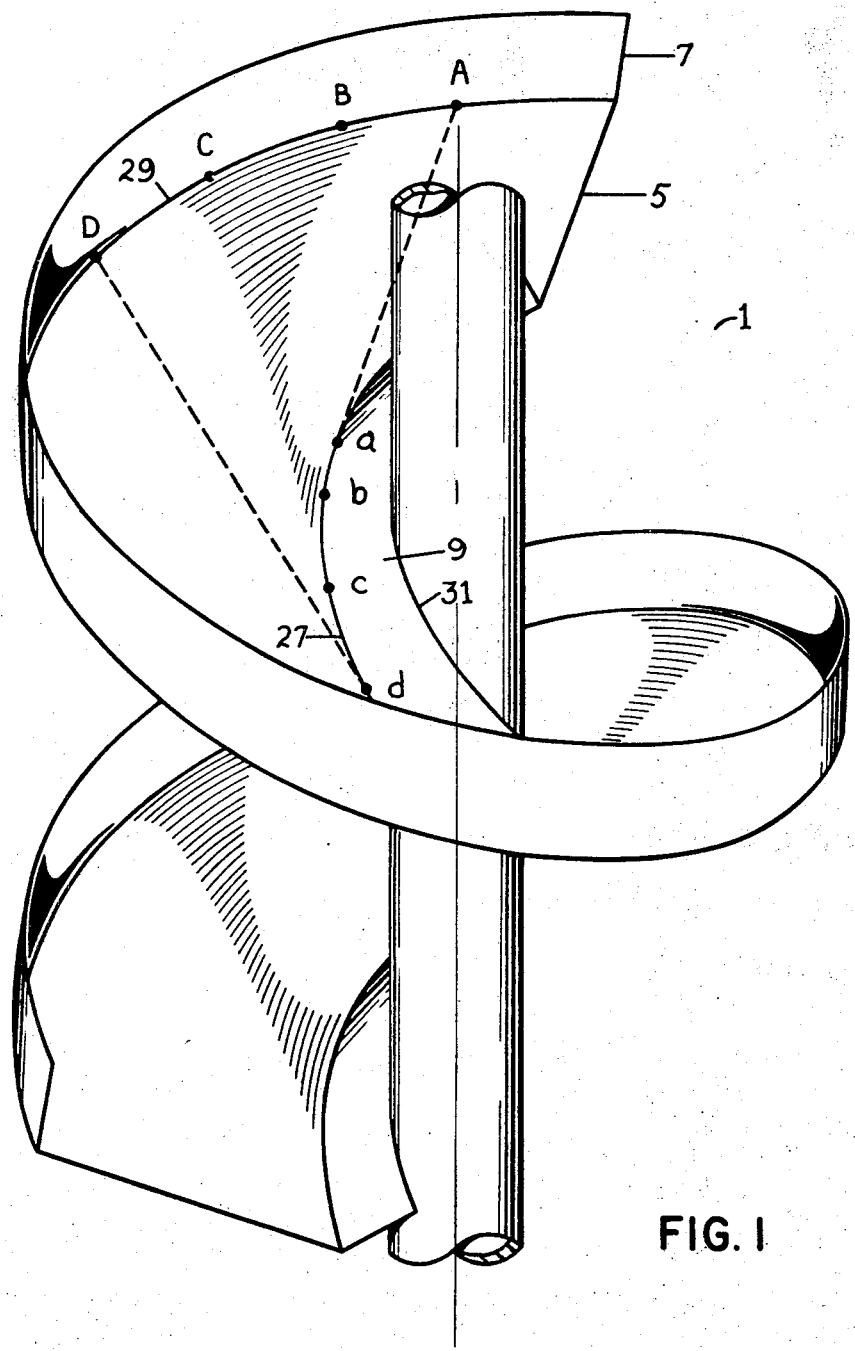
FIG. 1 is a view in perspective of part of spiral chute manufactured in accord with the present invention.

Referring to FIG. 1, the spiral chute 1 comprises a center pole 3, slide 5, inner wall 9 and outer wall 7. The center pole 3, with axis 13, extends vertically as shown and is supported at its top and bottom. The supports can be provided in any of numerous ways and are not an essential part of this invention.

It is easily appreciated that, for the same angular displacement around axis 13, a point on the inner edge 27 of the slide 5 must descend the same vertical distance as a point on the outer edge 29 of the slide but will travel a lesser total distance (being further away from the axis 13 or center or rotation) in its descent. Thus, as the inner egde 27 of the slide descends at a greater rate than the outer edge 29, it can be appreciated that a flat sheet, when made to conform to the shape of the slide, that is with differing rates of descent of its two edges, will tend to twist and buckle. For this reason prior art spiral chutes have been manufactured in accordance with the aforementioned "roll and weld," "brake" or "cakepan" methods which have attempted to minimize or compensate for the hitherto unavoidable twisting and buckling.

Referring to FIG. 2, in the "roll and weld" method, the flat sheet shape of the slide 11 is determined by conventional triangulation procedures and then cut out and sectioned into relatively short sections 33 along lines that may be considered as extending generally radially outward from the center pole 3. The sections are then rolled and twisted in an attempt to conform them to the differential rate of pitch required between the outer and inner edges and are placed in a jig or fixture to retain them more accurately at the desired twist, for which purpose the sections usually require somewhat more or less twist than has been imparted to them during the rolling process. In the jig, the sections are tacked and welded together. The required twisting introduces built-in undulations and relatively unpredictable variations along the surface of the slide and the many required welds 15 further distort the sections and offer numerous humps and ridges in the path of travel of an object descending the chute. In addition, as the butting edges of the sections are not straight, it is difficult to align them accurately, the result being that the welds are usually of larger than desirable size to compensate for the misalignment of the butting edges.

In the "brake" method, illustrated in FIG. 3, the sheets intended to form the slide 17 are cut into pie-shaped sections 19. Each section is braked, or bent, along an effectively diagonal line running from the lower corner 21 of the outside edge to the upper corner 23 of the inside edge, thus causing the inner edge to drop more rapidly than the outer edge (which is required for the spiral chute as previously noted). The sections are then assembled in a jig or fixture and they are welded together along lines 15. Alternatively, it is possible to eliminate many of the welds with this method by providing a large sheet with a series of bends. While this will, of course, satisfy objections to the excessive number of welds in the path of the sliding object, the resulting chute will nevertheless have a relatively discontinuous sliding surface composed of numerous abrupt and distinct bends and changes of planes.

The "cakepan" method consists of using multiple parts, each originally stamped or formed into the shape of a cakepan 25 (FIG. 4), which is then severed radially along line x—x. The two severed ends are then separated from each other, shown a distance y, thus twisting the cakepan into a spiral or helical configuration of 360 degrees wrap-around. However, the required twisting of the metal imposes a strict limitation to the allowable pitch of the chute. By pitch is meant the distance, measured along the axis of the center pole, that a point on the slide descends as it circumscribes 360 degrees. Stated another way, the severed ends of the cakepan 25 cannot be separated by any substantial distance y, or the material will buckle intolerably, and perhaps rupture. Consequently, if a large vertical displacement is required of the chute, this method requires the use of many dishpan sections which must then be welded together. In addition, a low pitch can preclude the application of the chute to those situations where a strong, net gravitational pull on the transferring object is necessary or desired.

Thus, multiple parts, low pitch, high costs, twisting of the metal causing lack of smoothness and buckling with excessive undulations or distortions, and numerous weldments in the path of the transferring object producing excessive vulnerability to contamination (which is especially important when foodstuff is the transferring object) are all prime disadvantages of existing and known methods of spiral chute construction. These disadvantages are overcome or significantly minimized by the present invention.

Figure 5:
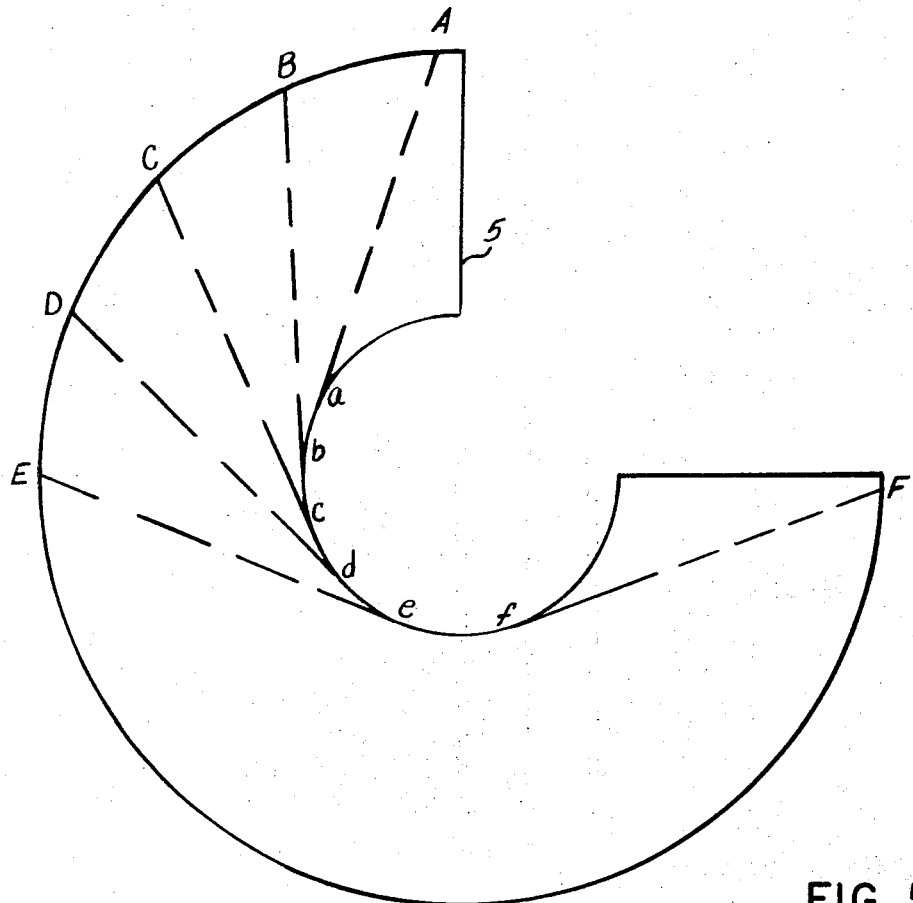
FIG. 5 is a plan view of a portion of a spiral slide as cut from a flat sheet preparatory to forming.
Figure 6:
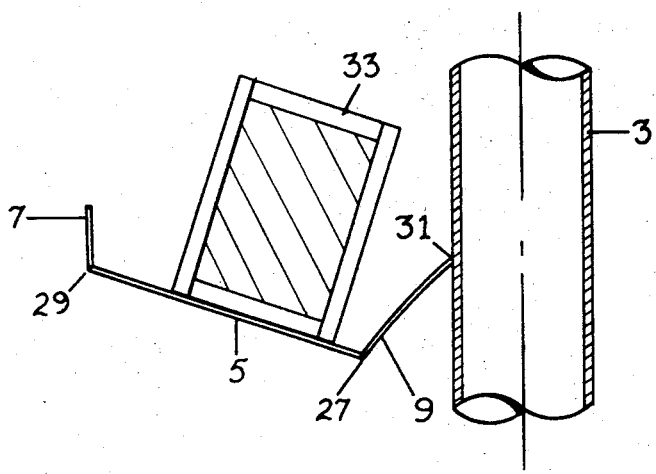
FIG. 6 is a sectional view taken through and parallel to the vertical axis of the chute of FIG. 1.

FIG. 5 illustrates a portion of the slide of FIG. 1 as determined and cut out of a flat sheet preparatory to the forming or rolling operation. Inner and outer edges of the sheet are circular. The sheet could, if desired, be cut to almost a full 360 degrees which would, upon forming into the spiral slide, provide a slide section of somewhat more than 360 degrees depending upon the pitch of the slide. However, for purposes of clarity of illustration, the flat sheet cutout of FIG. 5 is shown as having been cut at least than 360 degrees. After cutting out the flat sheet, lines a–A, b–B, c–C, d–D, e–E, etc. are scribed thereon tangent to the inner edge contour, and the sheet is then passed through an open end slip roller so that lines a–A, b–B, c–C, d–D and all lines tangent to the inner edge of slide 5 are substantially parallel to the rollers. In this way, the continuous bend imparted to the sheet by the roller proceeds around the scribed lines and all lines tangent to the inner edge 27, scribed or imaginary. This requires manipulation and adjustment of the sheet as it passes through the roller so that the longer outer edge 29 is moved through more rapidly than the shorter inner edge 27. Although the sheet can, of course, be rolled in this manner without the visual aid of lines a–A, b–B, etc. it has been found advantageous to scribe a number of such lines on the flat sheet so that they can be used as reference lines during the rolling.

To complete the spiral chute depicted in FIG. 1 requires fabrication of the inner wall 9 and outer wall 7, and their assembly with the slide 5 and the center pole 3. The inner wall is fabricated similarly to the slide 5 except that in this case the tangential lines are scribed tangent to the circle representing the inner edge of the inner wall 9, which is equal to the diameter of the center pole 3. The outer wall is a strip cut to the height desired and assembly of the chute is then accomplished by seam welding the inner wall 9 to the center pole 3, the slide 5 to the inner wall 27, and the outer wall 7 to the slide 5 along edges 31, 27 and 29 respectively.

In assembling slide 5 in position around the center pole 3 so as to form a chute of the desired pitch, it may be necessary to "open" or "close" the slide sections somewhat from the curled position into which they fall after having gone through the slip roller. If the flat sheet has been rolled too tight, it would tend to fall into a spiral of lesser pitch than desired; if the sheet has been rolled too loosely, it would tend to fall into a spiral of greater pitch than desired. In either case, within practical limits, the slide section may be opened up or closed in when being set in position around the center pole 3 preparatory to the various parts being welded or other wise attached to each other to form the spiral chute shown in FIG. 1. Thus, the degree of the roll or bend along the lines tangent to the inner edge is not critical. The most desirable extent of roll or bend for each particular slide configuration may easily be determined by running a few test sections. What is critical is that the flat sheet be "encouraged" to curl itself around straight lines tangential to the curve of the inner edge and such "encouragement" is provided by rolling or bending the flat sheet along these lines as directed hereinabove.

The process permits the manufacture of a slide 5 as shown in FIG. 1 from a minimal number of slide sections with butting edges that can be accurately matched with no twisting so as to permit small, unobtrusive weldments connecting the sections. The manner in which this is achieved is by cutting the butting edges of adjacent sections along a line tangent to the curve of the inner edge (preferably while the section is in the flat sheet state). For example along a–A of FIG. 5 as each section of the slide is rolled along lines tangent to the curve of the inner edge, the butting edge will be straight and thus can be easily matched and butt welded to similarly straight edge of the adjoining section.

A particular advantage is to be gained from the use of the inner wall 9 which, as seen in FIG. 1, is interposed between the slide 5 and the center pole 3 and then inclined with respect to the slide 5 to form a sort of V-section therewith as shown in FIG. 7 which is taken in a plane parallel to and through axis 13 of center pole 3. Preferably, the slide 5 is inclined downwardly toward the center pole 3 to offset the effect of the outward thrust of centrifugal force on the sliding object as it slides down the chute. Without such inclination the objects will tend to hug the outer wall 7 and cause excessive wear on the outer portion of the slide. Inclination of the slide alleviates this difficulty but the upper, inside corner of the sliding object 33 is, by virtue of the inclination, directed toward the center pole 3. If the slide directly adjoins the center pole, as is the common practice, the object may then tend to strike or catch on the center pole, thus impeding its movement. The inner wall 9 prevents this by causing the object to maintain, at its lower end, a minimal distance from the center pole 3.

It is to be understood that changes and modifications to the preferred embodiment illustrated and described herein can be made without departing from the spirit of the invention and the scope of the appended claims.

I claim:

1. A method of fabricating a section of a spiral chute slide comprising the steps of
    (a) determining the contour of the section on a flat sheet, said contour comprising an inner curved edge, an outer curved edge and a plurality of edges defiining the ends of said section,
    (b) cutting the flat sheet to said contour, and
    (c) bending the flat sheet along and around lines tangential to the inner curved edge.

2. A method of fabricating a spiral chute slide section comprising the steps of
    (a) determining the contour of said slide section on a flat sheet, said contour comprising a discontinuous annular ring,
    (b) cutting the flat sheet to said contour, and
    (c) bending the flat sheet along and around lines tangential to the inner edge of said discontinuous annular ring.

3. A method of fabricating a spiral chute slide comprising the method of fabricating two or more spiral chute slide sections as set forth in claim 1 and joining each of said sections to another of said sections along a respective end of each section.

4. In a method of fabricating a spiral chute slide section wherein a predetermined shape comprising inner and outer curved edges and a plurality of edges defining the ends of said section is cut from a flat sheet, the improvement of bending said flat sheet along and around lines tangent to the curve of said inner edge.

References Cited

UNITED STATES PATENTS

| | | | |
|---|---|---|---|
| 1,256,724 | 2/1918 | Pardee | 193—12 |
| 1,884,203 | 10/1932 | Pickhard | 29—157.3 |
| 2,262,691 | 11/1941 | Matter | 29—14 |
| 2,460,024 | 1/1949 | McKee | 29—157.3X |
| 2,669,012 | 2/1954 | Bruegger | 29—157.3 |
| 2,917,815 | 12/1959 | Alexandrovsky | 29—156.8 |
| 3,000,084 | 9/1961 | Garland | 29—157.3 |

JOHN F. CAMPBELL, Primary Examiner

V. A. DIPALMA, Assistant Examiner

U.S. Cl. X.R.

29—156.8; 72—324, 338, 379